Oct. 31, 1967   H. S. BOURGEOIS   3,349,803
BYPASS CONNECTION FOR SPLITTING A FUEL FLOW
Filed April 22, 1965

INVENTOR
HECTOR S. BOURGEOIS
BY Charles A. Warren
ATTORNEY

United States Patent Office 3,349,803
Patented Oct. 31, 1967

3,349,803
BYPASS CONNECTION FOR SPLITTING A FUEL FLOW
Hector S. Bourgeois, Cincinnati, Ohio, assignor to United Aircraft Corporation, East Hartford, Conn., a corporation of Delaware
Filed Apr. 22, 1965, Ser. No. 450,045
3 Claims. (Cl. 138—37)

ABSTRACT OF THE DISCLOSURE

A fluid conduit wherein a T arrangement is provided for the removal of a portion of fluid from the main flow through the T arrangement without disturbing the main flow.

---

This invention relates to a T for use in a fluid conduit by which to split off part of the flow without disturbing the main flow.

Where a T connection is used in a fluid conduit for removing a part of the fluid from the conduit, the discharge through the lateral opening in the T causes a serious disturbance in the main flow and does not assure a proper division of the fluid in the main flow. A feature of this invention is an arrangement for a T by which to remove a portion of the fluid from the main flow through the T without disturbing the main flow. Another feature is a T which accommodates a turbulent or spiral flow and which under these conditions will remove a portion of the flow uniformly around the periphery of the main flow.

Other features and advantages will be apparent from the specification and claims, and from the accompanying drawing which illustrates an embodiment of the invention.

Figure 1:
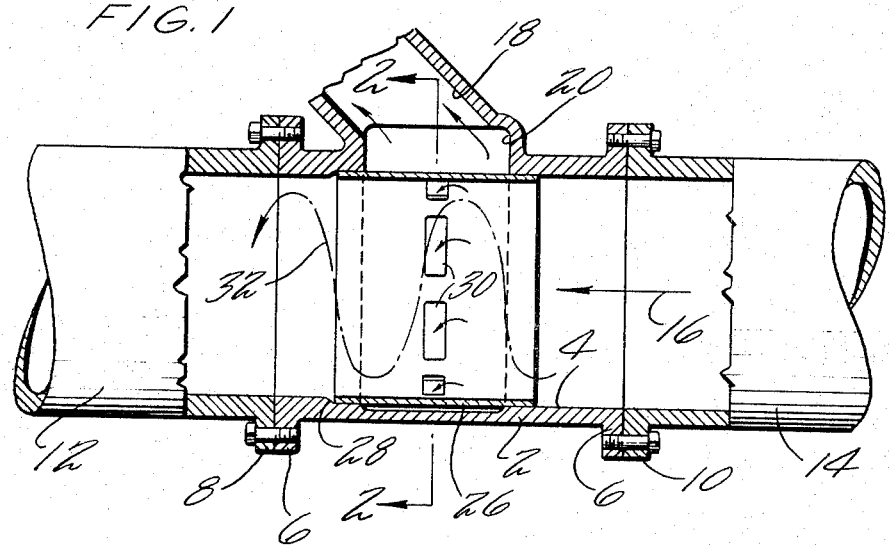
FIG. 1 is a longitudinal sectional view through a T embodying the invention.

The T has a base 2 with a longitudinal passage 4 therethrough. The base has attachment means 6 at opposite ends in the form of flanges to which the end flanges 8 and 10, respectively, of pipes 12 and 14 are attached. The pipes 12 and 14 form with the longitudinal passage 4 a duct through which fluid flows normally in the direction indicated by the arrow 16.

Figure 2:
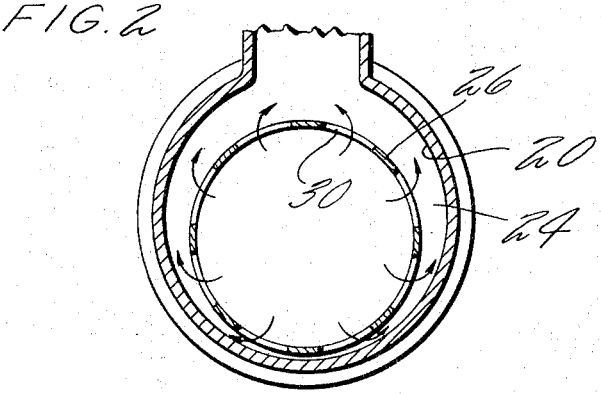
FIG. 2 is a transverse sectional view along line 2—2 of FIG. 1.

The purpose of the invention is to withdraw a part of the fluid flowing through the duct without interfering materially with the main stream and by removing substantially uniform amounts of fluid around the periphery of the longitudinal passage. To this end the base 2 has a lateral passage 18 through which the fluid drawn off is discharged and this passage communicates with an annular groove 20 formed in the base and open to the longitudinal passage 4 throughout its periphery. The annular groove 20 is slightly eccentric to the longitudinal passage 4 so that as shown in FIG. 2 the area of the passage 24 defined by the groove 20 decreases in dimension from its communication with the passage 18 to a point on the opposite side of the base 2.

Fitting within the base 2 and in contact with the wall of the longitudinal passage 4 is a sleeve 26 which is dimensioned to have contact with the wall of the passage 4 throughout its periphery. The end of the sleeve 26 engages with a shoulder 28 formed in the base 2 with its shoulder locating the sleeve so that it overlies the groove 20. As shown, the sleeve 26 is longer than the axial length of the groove 20, as shown. The sleeve 26 has a plurality of uniformly spaced and uniformly shaped openings 30 arranged in a row around its periphery and these openings provide a communication from the longitudinal passage into the groove 20. By the uniform spacing and uniform arrangement of these openings, it is clear that a uniform quantity of fluid will pass through each of the openings through the groove 20 thereby withdrawing a substantially uniformly distributed quantity of fluid from the main fluid stream around the entire periphery of this stream. Obviously, by changing the sleeve 26 for another sleeve having different sizes of openings, it is possible to determine the percent of the main fluid that is drawn off through the lateral passage 18. The device will function to remove fluid from any type of stream but it has utility in a stream where the flow may be swirling, such as a helical flow, as represented by the arrow 32 or where the flow through the duct is turbulent.

It is to be understood that the invention is not limited to the specific embodiment herein illustrated and described, but may be used in other ways without departure from its spirit as defined by the following claims.

I claim:

1. A T for a fluid conduit, said T including a base having a cylindrical longitudinal passage therethrough and attachment means at each end of the passage for connection to pipes forming, with the passage, the fluid conduit, said base having a cylindrical internal groove in the wall of the passage, said groove being eccentric to the passage and communicating with the passage throughout its periphery, a lateral passage in the base communicating with the groove in the area of maximum eccentricity of the groove, and a sleeve positioned in said base to overlie the groove and in contact with the longitudinal passage throughout its periphery, said sleeve having a row of similar openings uniformly spaced about the periphery of the sleeve and providing communication from the longitudinal passage to the groove.

2. A T as in claim 1 in which a shoulder is formed in the wall of the longitudinal passage, and the sleeve abuts the shoulder in the direction of flow of the fluid through the passage.

3. A T as in claim 1 in which the base has a shoulder formed in the wall of the longitudinal passage, and the sleeve abuts this shoulder, the spacing being such that the shoulder locates the sleeve with the openings therein in alignment with the groove.

References Cited
UNITED STATES PATENTS
| | | | |
|---|---|---|---|
| 2,191,724 | 9/1937 | Newton | 138—37 |
| 2,778,348 | 1/1957 | Percival | 138—37 |
| 2,969,925 | 1/1961 | Burgess | 137—561 |
| 3,165,166 | 1/1965 | Hall | 137—568 |

FOREIGN PATENTS
6,988  1/1900  Great Britain.

M. CARY NELSON, *Primary Examiner.*
W. R. CLINE, *Assistant Examiner.*